(12) United States Patent
Feller

(10) Patent No.: US 11,524,445 B2
(45) Date of Patent: Dec. 13, 2022

(54) DENTAL MODEL AND REUSABLE DIE ASSEMBLY FOR THERMOFORMING OF DENTAL ALIGNERS

(71) Applicant: Carbon, Inc, Redwood City, CA (US)

(72) Inventor: Bob E. Feller, San Mateo, CA (US)

(73) Assignee: Carbon, Inc., Redwood City, CA (US)

( * ) Notice: Subject to any disclaimer, the term of this patent is extended or adjusted under 35 U.S.C. 154(b) by 351 days.

(21) Appl. No.: 16/542,672

(22) Filed: Aug. 16, 2019

(65) Prior Publication Data

US 2020/0055229 A1 Feb. 20, 2020

Related U.S. Application Data

(60) Provisional application No. 62/764,897, filed on Aug. 16, 2018.

(51) Int. Cl.
| | |
|---|---|
| *B29C 51/30* | (2006.01) |
| *A61C 13/34* | (2006.01) |
| *A61C 7/08* | (2006.01) |
| *B33Y 10/00* | (2015.01) |
| *B33Y 50/02* | (2015.01) |
| *B29C 33/38* | (2006.01) |
| *B29C 51/08* | (2006.01) |
| *B29C 64/124* | (2017.01) |
| *B29C 64/393* | (2017.01) |
| *B33Y 80/00* | (2015.01) |
| *B29L 31/00* | (2006.01) |

(52) U.S. Cl.
CPC ............... *B29C 51/30* (2013.01); *A61C 7/08* (2013.01); *A61C 13/34* (2013.01); *B29C 33/3842* (2013.01); *B29C 51/082* (2013.01); *B29C 64/124* (2017.08); *B29C 64/393* (2017.08); *B33Y 10/00* (2014.12); *B33Y 50/02* (2014.12); *B33Y 80/00* (2014.12); *B29K 2905/00* (2013.01); *B29L 2031/753* (2013.01)

(58) Field of Classification Search
CPC ....... B29C 51/30; B29C 51/082; B29C 51/10; B29C 64/124; B29C 64/393; B33Y 10/00; B33Y 50/02; B33Y 80/00; A61C 7/08; A61C 13/34
See application file for complete search history.

(56) References Cited

U.S. PATENT DOCUMENTS

| | | | |
|---|---|---|---|
| 6,976,627 B1 | 12/2005 | Culp et al. | |
| 7,092,784 B1 | 8/2006 | Simkins | |
| 7,481,647 B2 | 1/2009 | Sambu et al. | |
| 7,641,828 B2 | 1/2010 | Desimone et al. | |
| 9,108,338 B2 | 8/2015 | Sirovskiy et al. | |
| 2005/0017394 A1* | 1/2005 | Hochsmann | B29C 64/165 264/113 |
| 2006/0078841 A1 | 4/2006 | Desimone et al. | |
| 2008/0050692 A1 | 2/2008 | Hilliard | |
| 2008/0141534 A1* | 6/2008 | Hilliard | A61C 7/02 29/896.11 |
| 2017/0008333 A1* | 1/2017 | Mason | A61C 7/08 |
| 2019/0163060 A1* | 5/2019 | Skamser | G03F 7/031 |
| 2019/0231479 A1* | 8/2019 | Knopp | A61C 7/00 |
| 2021/0153978 A1* | 5/2021 | Parkar | B29C 51/14 |

* cited by examiner

*Primary Examiner* — Nahida Sultana
(74) *Attorney, Agent, or Firm* — Myers Bigel, P.A.

(57) ABSTRACT

An assembly useful for thermoforming a dental aligner from polymer sheet material includes (a) a custom dental model having a planar bottom surface and a receptacle formed in said planar bottom surface; and (b) a reusable die removably received in said receptacle.

9 Claims, 3 Drawing Sheets

DENTAL MODEL AND REUSABLE DIE ASSEMBLY FOR THERMOFORMING OF DENTAL ALIGNERS

RELATED APPLICATIONS

This applications claims priority to U.S. Provisional Application Ser. No. 62/764,897, filed Aug. 16, 2019, the disclosure of which is hereby incorporated by reference in its entirety.

FIELD OF THE INVENTION

The present invention concerns methods of making polymer dental aligners in which the amount of discarded polymer is reduced.

BACKGROUND OF THE INVENTION

Clear aligners, or polymer aligners, were introduced by Align technologies as the INVISALIGN® line of products in 1999 and have become a popular alternative to conventional braces. In this system, successive aligners incorporating gradual changes in tooth positions are made, and used in sequence by the patient, to gradually urge teeth from an initial position to a desired final position.

The aligners themselves are typically produced by thermoforming a sheet of polymer over a custom dental model. See U.S. Pat. Nos. 9,108,338; 7,641,828; and 7,092,784; US Patent Application Publication Nos. 20080050692 and 20060078841. The custom models used to thermoform the aligners are in turn produced by additive manufacturing from a digital model derived from the teeth and jaw structure of the patient for whom the aligners are produced. See, e.g., U.S. Pat. Nos. 7,481,647 and 6,976,627.

Since a different custom model must be produced for each successive aligner in the set of aligners used for gradually repositioning the patient's teeth, and models suitable for one patient are not suitable for another, a large number of custom models—and a significant amount of polymer—is discarded. With appreciation for the environmental impact of excess waste polymer increasing, there is a need for new approaches to the manufacture of polymer dental aligners that reduces the amount of polymer discarded.

SUMMARY OF THE INVENTION

In some embodiments, an assembly useful for thermoforming a dental aligner from polymer sheet material includes (a) a custom dental model having a planar bottom surface and a receptacle formed in said planar bottom surface; and (b) a reusable die removably received in said receptacle.

In some embodiments, the dental model is comprised of polymer.

In some embodiments, the reusable die is comprised of metal or polymer.

In some embodiments, the die comprises a distinguishing feature element.

In some embodiments, the dental model has a top portion configured as a set of human teeth on which said dental aligner can be formed.

In some embodiments, the receptacle comprises at least half the volume of said dental model.

In some embodiments, the reusable die is configured to stabilize and rigidify said dental model for thermoforming a dental aligner from polymer sheet material thereon.

In some embodiments, a method of making a dental aligner from polymer sheet material includes (a) receiving data for a unique dental model; (b) selecting a corresponding die for the unique dental model from a set of available dies; (c) modifying the data to include a receptacle for the selected die; (d) additively manufacturing the dental model from the modified data; (e) inserting the selected die into the receptacle to form a model and die assembly; and (f) thermoforming a dental aligner from the polymer sheet material on the model and die assembly.

In some embodiments, the method further includes (g) separating the dental aligner from the model and die assembly; and then (h) separating the die from the dental model so that said die can be reused.

In some embodiments, the set of available dies comprises at least 2 or 3 members of different sizes, at least all but one of the members having different distinguishing feature elements formed thereon.

In some embodiments, the receptacle comprises at least half the volume of the dental model.

In some embodiments, the reusable die is configured to stabilize and rigidify the dental model for thermoforming a dental aligner from the polymer sheet material thereon.

In some embodiments, the additively manufacturing step is carried out by stereolithography (preferably by bottom-up stereolithography, such as by continuous liquid interface production).

The foregoing and other objects and aspects of the present invention are explained in greater detail in the drawings herein and the specification set forth below. The disclosures of all United States patent references cited herein are to be incorporated herein by reference.

DETAILED DESCRIPTION OF ILLUSTRATIVE EMBODIMENTS

Figure 1A:
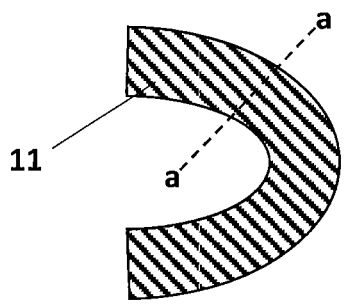
FIG. 1A is a top, schematic, view of a custom dental model.

The present invention is now described more fully hereinafter with reference to the accompanying drawings, in which embodiments of the invention are shown. This invention may, however, be embodied in many different forms and should not be construed as limited to the embodiments set forth herein; rather these embodiments are provided so that this disclosure will be thorough and complete and will fully convey the scope of the invention to those skilled in the art.

As used herein, the term "and/or" includes any and all possible combinations of one or more of the associated listed items, as well as the lack of combinations when interpreted in the alternative ("or").

1. Production by Additive Manufacturing.

Techniques for additive manufacturing are known. Suitable techniques include bottom-up or top-down additive manufacturing, generally known as stereolithography. Such methods are known and described in, for example, U.S. Pat. No. 5,236,637 to Hull, U.S. Pat. Nos. 5,391,072 and 5,529,473 to Lawton, U.S. Pat. No. 7,438,846 to John, U.S. Pat. No. 7,892,474 to Shkolnik, U.S. Pat. No. 8,110,135 to El-Siblani, U.S. Patent Application Publication No. 2013/0292862 to Joyce, and US Patent Application Publication No. 2013/0295212 to Chen et al. The disclosures of these patents and applications are incorporated by reference herein in their entirety.

In some embodiments, the intermediate object is formed by continuous liquid interface production (CLIP). CLIP is known and described in, for example, PCT Application Nos. PCT/US2014/015486 (published as U.S. Pat. No. 9,211,678 on Dec. 15, 2015); PCT/US2014/015506 (also published as U.S. Pat. No. 9,205,601 on Dec. 8, 2015), PCT/US2014/015497 (also published as U.S. Pat. No. 9,216,546 on Dec. 22, 2015), and in J. Tumbleston, D. Shirvanyants, N. Ermoshkin et al., Continuous liquid interface production of 3D Objects, *Science* 347, 1349-1352 (published online 16 Mar. 2015). See also R. Janusziewcz et al., Layerless fabrication with continuous liquid interface production, *Proc. Natl. Acad. Sci. USA* 113, 11703-11708 (Oct. 18, 2016). In some embodiments, CLIP employs features of a bottom-up three-dimensional fabrication as described above, but the irradiating and/or said advancing steps are carried out while also concurrently maintaining a stable or persistent liquid interface between the growing object and the build surface or window, such as by: (i) continuously maintaining a dead zone of polymerizable liquid in contact with said build surface, and (ii) continuously maintaining a gradient of polymerization zone (such as an active surface) between the dead zone and the solid polymer and in contact with each thereof, the gradient of polymerization zone comprising the first component in partially cured form. In some embodiments of CLIP, the optically transparent member comprises a semipermeable member (e.g., a fluoropolymer), and the continuously maintaining a dead zone is carried out by feeding an inhibitor of polymerization through the optically transparent member, thereby creating a gradient of inhibitor in the dead zone and optionally in at least a portion of the gradient of polymerization zone. Other approaches for carrying out CLIP that can be used in the present invention and potentially obviate the need for a semipermeable "window" or window structure include utilizing a liquid interface comprising an immiscible liquid (see L. Robeson et al., WO 2015/164234, published Oct. 29, 2015), generating oxygen as an inhibitor by electrolysis (see I Craven et al., WO 2016/133759, published Aug. 25, 2016), and incorporating magnetically positionable particles to which the photoactivator is coupled into the polymerizable liquid (see J. Rolland, WO 2016/145182, published Sep. 15, 2016).

After the three-dimensional object is formed, it is optionally but preferably cleaned, optionally dried (e.g., air dried) and/or rinsed (in any sequence). In some embodiments it may be further cured, preferably by heating (although further curing may in some embodiments be concurrent with the first cure, or may be by different mechanisms such as contacting to water, as described in U.S. Pat. No. 9,453,142 to Rolland et al.).

Objects as described above can be cleaned in any suitable apparatus, in some embodiments with a wash liquid as described above and below, and in other embodiments by wiping (with an absorbent, air blade, etc.) spinning, or variations thereof.

Wash liquids that may be used to carry out the present invention include, but are not limited to, water, organic solvents such as alcohols (methanol, ethanol, propanol, butanol, etc.), or combinations thereof (e.g., combined as co-solvents), optionally containing additional ingredients such as surfactants, chelants (ligands), enzymes, borax, dyes or colorants, fragrances, etc., including combinations thereof. The wash liquid may be in any suitable form, such as a solution, emulsion, dispersion, etc.

In some embodiments, the wash liquid comprises or consists of a 50:50 (volume:volume) solution of water and an alcohol organic solvent such as isopropanol (2-propanol).

Examples of hydrofluorocarbon solvents that may be used to carry out the present invention include, but are not limited to, 1,1,1,2,3,4,4,5,5,5-decafluoropentane (Vertrel® XF, DuPont™ Chemours), 1,1,1,3,3-Pentafluoropropane, 1,1,1,3,3-Pentafluorobutane, etc.

Examples of hydrochlorofluorocarbon solvents that may be used to carry out the present invention include, but are not limited to, 3,3-Dichloro-1,1,1,2,2-pentafluoropropane, 1,3-Dichloro-1,1,2,2,3-pentafluoropropane, 1,1-Dichloro-1-fluoroethane, etc., including mixtures thereof.

Examples of hydrofluoroether solvents that may be used to carry out the present invention include, but are not limited to, methyl nonafluorobutyl ether (HFE-7100), methyl nonafluoroisobutyl ether (HFE-7100), ethyl nonafluorobutyl ether (HFE-7200), ethyl nonafluoroisobutyl ether (HFE-7200), 1,1,2,2-tetrafluoroethyl-2,2,2-trifluoroethyl ether, etc., including mixtures thereof. Commercially available examples of this solvent include Novec 7100 (3M), Novec 7200 (3M).

Examples of volatile methylsiloxane solvents that may be used to carry out the present invention include, but are not limited to, hexamethyldisiloxane (OS-10, Dow Corning), octamethyltrisiloxane (OS-20, Dow Corning), decamethyltetrasiloxane (OS-30, Dow Corning), etc., including mixtures thereof.

Other siloxane solvents (e.g., NAVSOLVE™ solvent) that may be used to carry out the present invention include but are not limited to those set forth in U.S. Pat. No. 7,897,558.

In some embodiments, the wash liquid comprises an azeotropic mixture comprising, consisting of, or consisting essentially of a first organic solvent (e.g., a hydrofluorocarbon solvent, a hydrochlorofluorocarbon solvent, a hydrofluoroether solvent, a methylsiloxane solvent, or a combination thereof; e.g., in an amount of from 80 or 85 to 99 percent by weight) and a second organic solvent (e.g., a C1-C4 or C6 alcohol such as methanol, ethanol, isopropanol, tent-butanol, etc.; e.g., in an amount of from 1 to 15 or 20 percent by weight). Additional ingredients such as surfactants or chelants may optionally be included. In some embodiments, the azeotropic wash liquid may provide superior cleaning properties, and/or enhanced recyclability, of the wash liquid. Additional examples of suitable azeotropic wash liquids include, but are not limited to, those set forth in U.S. Pat. Nos. 6,008,179; 6,426,327; 6,753,304; 6,288,018; 6,646,020; 6,699,829; 5,824,634; 5,196,137; 6,689,734; and 5,773,403, the disclosures of which are incorporated by reference herein in their entirety.

When the wash liquid includes ingredients that are not desired for carrying into the further curing step, in some embodiments the initial wash with the wash liquid can be followed with a further rinsing step with a rinse liquid, such as water (e.g., distilled and/or deionized water), or a mixture of water and an alcohol such as isopropanol.

Figure 1B:
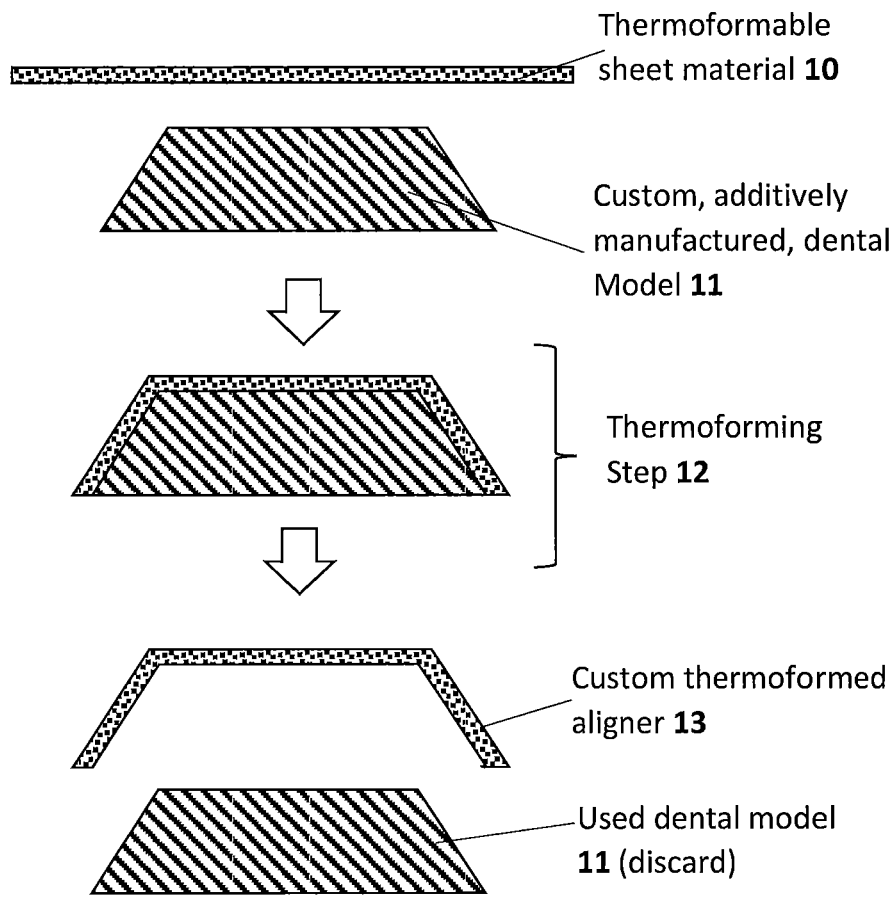
FIG. 1B schematically illustrates a method of making a dental aligner from a custom dental model of FIG. 1A, as is known in the art.

FIG. 1A is a top, schematic, view of a custom dental model, and FIG. 1B schematically illustrates a method of making a dental aligner from a custom dental model of FIG. 1A, as is known in the art. As shown in FIG. 1B, a thermoformable sheet material 10 is and a custom, additively manufactured, dental model 11 is shown. The sheet material 10 is thermoformed on the dental model 11 in Step 12. The resulting custom thermoformed aligner 13 is removed from the dental model 11, and the dental model 11 is discarded. This results in significant waste because the dental model 11 is discarded.

Figure 2:
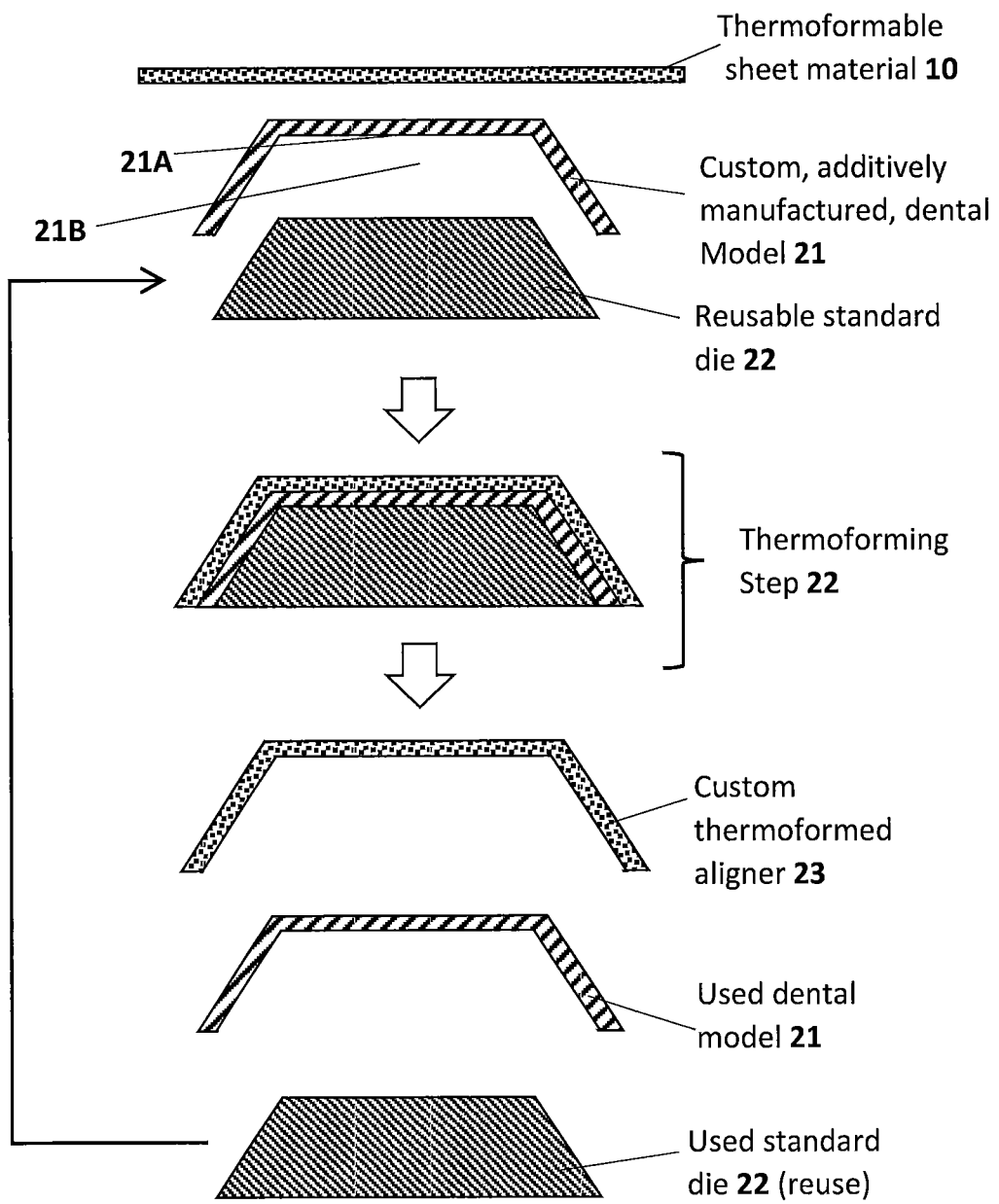
FIG. 2 schematically illustrates portions of a method of making a dental aligner of the present invention, in which a reusable die is introduced to reduce the amount of polymer which must be incorporated in the custom dental model.

FIG. 2 schematically illustrates portions of a method of making a dental aligner of the present invention, in which a reusable die is introduced to reduce the amount of polymer which must be incorporated in the custom dental model. As shown in FIG. 2, an assembly useful for thermoforming a dental aligner from polymer sheet material includes a custom dental model 21 having a planar bottom surface 21A and a receptacle 21B formed in said planar bottom surface. A reusable die 22 is removably received in the receptacle 21B. A thermoformable sheet material 10 is positioned over the dental model 21 as shown in Step 22 and thermoformed to the dental model 21. After the custom thermoformed aligner is formed, the aligner 23 is removed from the dental model 21, and the used dental model 21 is removed from the reusable standard die 22.

In this configuration, the small dental model 21 may be discarded rather than discarding the larger dental model 11 shown in FIG. 1B, which results in less waste.

Figure 3:
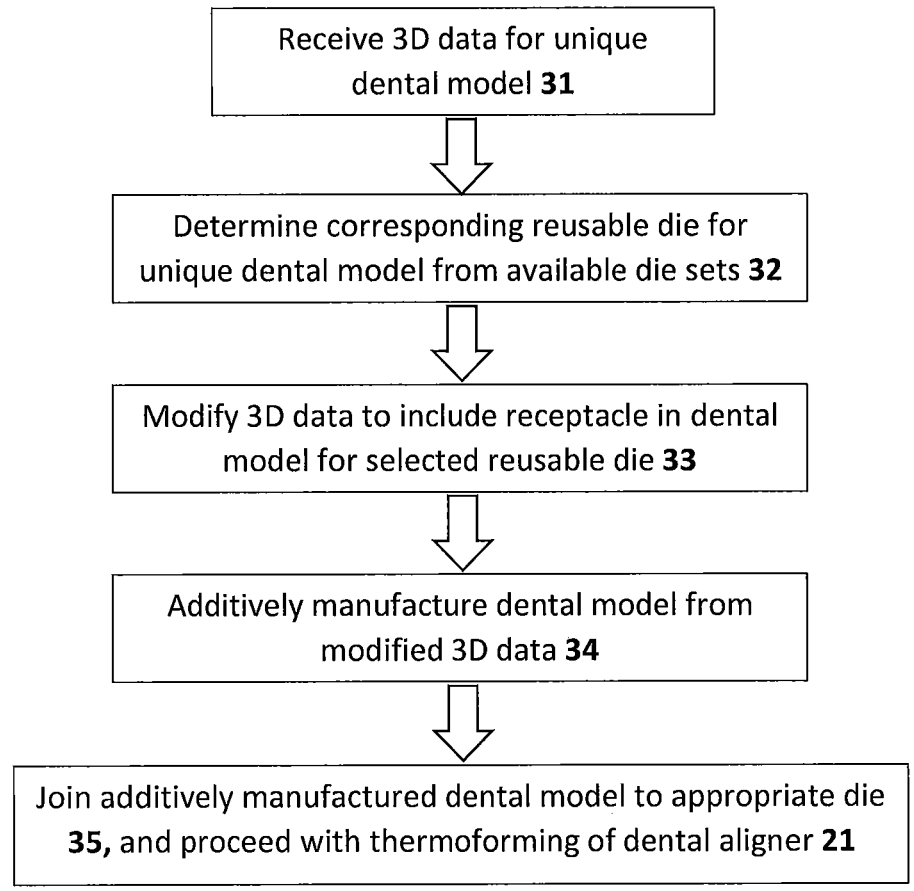
FIG. 3 schematically illustrates additional portions of a method of the present invention, in which a digital model for a custom dental model is modified to create a receptacle in the model for receiving a reusable die.

FIG. 3 schematically illustrates additional portions of a method of the present invention, in which a digital model for a custom dental model is modified to create a receptacle in the model for receiving a reusable die. As illustrated, 3D data may be received for a unique, customized dental model (Step 31), for example, based on 3D modeling data received for an actual patient. In some embodiments, a corresponding reusable die for a unique dental model may be determined from available die sets (Step 32). Stated otherwise, the reusable die 22 in FIG. 2 may be one of a set of reusable die that are used with appropriately sized dental models. Various reusable die sizes may be provided based on the size and shape of the patient's dental 3D data. The 3D data may be modified to include the receptacle in the dental model for the selected reusable die (Step 33). The dental model may be additively manufactured from the modified 3D data (Step 34), for example, using the additive manufacturing processes described herein. The additively manufactured dental model may be joined to the appropriate die at step 35 and then thermoformed as described herein.

Figure 4:
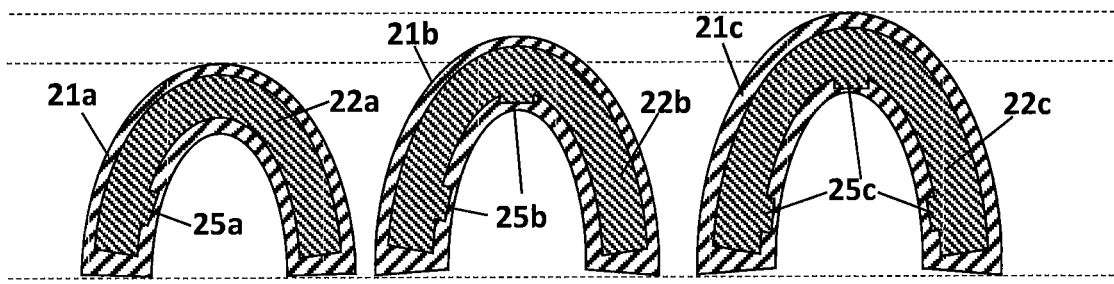
FIG. 4 schematically illustrate, by a top view, three custom dental models of different sizes, each received on an appropriate, corresponding, reusable dental die.

FIG. 4 is a schematic top view of three of different sizes of dental die 21a, 21b, 21c, each received on an appropriate, corresponding, custom dental model 22a, 22b, 22c. In some embodiments, the die 21a, 21b, 21c have identifying features for identifying the size of the die, and the custom models 22a, 22b, 22c include corresponding features (25a, 25b, 25c) to mate with the shape of the die 21a, 21b, 21c. The die 21a, 21b, 21c may be of any suitable shape, and in some embodiments, the dental model 22a, 22b, 22c may have a top portion configured as a set of human teeth on which the dental aligner can be formed. It should be understood that any suitable number of sizes of die may be used, such as more than three.

Any suitable materials may be used. In some embodiments, the dental model is comprised of polymer. In some embodiments, the reusable die is comprised of metal or polymer. In some embodiments, the receptacle of the model is at least half the volume of the dental model. The reusable die may be configured to stabilize and rigidify said dental model for thermoforming a dental aligner from polymer sheet material thereon.

In addition to reducing waste, the production speed of the dental aligner model may be increased because a smaller model is made by additive manufacturing and used together with a reusable die. In contrast, in the prior methods discussed in FIGS. 1A and 1B the entire model is typically made by additive manufacturing, which is more time consuming. For example, a thickness of the custom dental model may be less than 30, 20, 10 or 5 mm.

In some embodiments, drain openings or apertures may be made in the custom, additively manufactured dental model to increase production speed, and/or the model may be built on a printed "mesh base," and/or the model may have channels or perforations therein.

The foregoing is illustrative of the present invention, and is not to be construed as limiting thereof. The invention is defined by the following claims, with equivalents of the claims to be included therein.

The invention claimed is:

1. A method of making a dental aligner from polymer sheet material, comprising the steps of:
    (a) receiving data for a dental model;
    (b) selecting a corresponding die for the unique dental model from a set of available dies;
    (c) modifying the data to include a receptacle in the dental model for the selected die;
    (d) additively manufacturing the dental model with the receptacle therein from the modified data, wherein said additively manufactured step is carried out by stereolithography;
    (e) inserting the selected die into the receptacle of the dental model to form an assembly comprising the dental model and the die; and
    (f) thermoforming a dental aligner from the polymer sheet material on the assembly.

2. The method of claim 1, further comprising:
    (g) separating the dental aligner from the assembly; and then
    (h) separating the die from the dental model so that said die can be reused.

3. The method of claim 1, wherein said set of available dies comprises at least 2 or 3 members of different sizes, at least all but one of said members having different distinguishing feature elements formed thereon.

4. The method of claim 3, wherein additively manufacturing said dental model comprises forming a corresponding feature element to mate with said distinguishing feature element of said selected die.

5. The method of claim 1, wherein said receptacle comprises at least half the volume of said dental model.

6. The method of claim 1, wherein said selected die from the set of available dies is configured to stabilize and rigidify said dental model for thermoforming a dental aligner from polymer sheet material thereon.

7. The method of claim 1, wherein said additively manufacturing step is carried out by bottom-up stereolithography or by continuous liquid interface production.

8. The method of claim 1, wherein said selected die is comprised of metal or polymer.

9. The method of claim 1, wherein said dental model comprises a top portion configured as a set of human teeth on which said dental aligner can be formed.

* * * * *

UNITED STATES PATENT AND TRADEMARK OFFICE
CERTIFICATE OF CORRECTION

| | |
|---|---|
| PATENT NO. | : 11,524,445 B2 |
| APPLICATION NO. | : 16/542672 |
| DATED | : December 13, 2022 |
| INVENTOR(S) | : Bob E. Feller |

It is certified that error appears in the above-identified patent and that said Letters Patent is hereby corrected as shown below:

In the Specification

Column 4, Line 53: Please correct "tent-butanol," to read --*tert*-butanol,--

Signed and Sealed this
Twenty-first Day of March, 2023

Katherine Kelly Vidal
*Director of the United States Patent and Trademark Office*